United States Patent [19]
Jin et al.

[11] Patent Number: 5,274,734
[45] Date of Patent: Dec. 28, 1993

[54] ARTICLE COMPRISING A RARE EARTH OR TRANSITION METAL DOPED OPTICAL FIBER

[75] Inventors: Shungho Jin, Millington; Paul J. Lemaire, Madison; Kenneth L. Walker, New Providence, all of N.J.

[73] Assignee: AT&T Bell Laboratories, Murray Hill, N.J.

[21] Appl. No.: 937,224

[22] Filed: Aug. 28, 1992

[51] Int. Cl.$^5$ .............. G02B 6/02; G02B 6/00
[52] U.S. Cl. .................. 385/142; 385/123; 385/128; 385/144; 385/141; 359/341
[58] Field of Search .......... 385/123, 126, 127, 128, 385/141, 142, 144, 147; 427/163; 359/341, 342, 343, 345; 372/6

[56] References Cited

U.S. PATENT DOCUMENTS

| | | | |
|---|---|---|---|
| 4,717,236 | 1/1988 | Dewing | 385/109 X |
| 4,718,747 | 1/1988 | Bianchi et al. | 385/109 X |
| 4,962,995 | 10/1990 | Andrews et al. | 385/123 X |
| 4,964,694 | 10/1990 | Oohashi et al. | 384/128 X |
| 5,000,541 | 3/1991 | DiMarcello et al. | 385/128 X |
| 5,013,130 | 5/1991 | Atkins et al. | 427/163 X |
| 5,042,039 | 8/1991 | Edagawa et al. | 385/123 X |
| 5,058,976 | 10/1991 | DiGiovanni et al. | 359/173 |
| 5,059,229 | 10/1991 | Blankenship et al. | 65/2 |
| 5,125,066 | 6/1992 | Ishiguro et al. | 385/142 |
| 5,146,534 | 9/1992 | Lines | 385/142 |

OTHER PUBLICATIONS

"Hydrogen-Induced Loss Increases in Germanium-Doped Single-Mode Optical Fibers: Long-Term Predictions", by A. Tomita et al., Electronics Letters, vol. 21, No. 2, Jan. 17, 1985, pp. 71–72.

"Behavior of Single Mode MCVD Fibers Exposed to Hydrogen", by P. J. Lemaire et al., Conference Proceedings, 10th European Conference on Optical Communications, Stuttgart, Sep. 1984.

"Diffusion of Hydrogen Through Hermetic Carbon Films on Silica Fibers", by P. J. Lemaire et al., Materials Research Society Symposium Proceedings, vol. 172, 1990, pp. 85–96.

"Characterization of Hydrogen Diffusion in Hermetically Coated Optical Fibers", by P. J. Lemaire et al., Technical Digest-Symposium on Optical Fiber Measurements, National Institute of Science and Technology, Boulder, Colo., Sep. 1990, Special Publication No. 792.

"Hermetic Erbium-Doped Fiber Coils for Compact Optical Amplifier Modules", by A. Oyobe et al., Technical Digest, Conference on Optical Fiber Communication, San Diego, Calif., Feb. 1992, p. 114.

"Hydrogen Absorption in Intermetallic Compounds", by K. H. J. Buschow, Handbook of the Physics and Chemistry of Rare Earths, vol. 6, pp. 90–97 (1984).

"Hydrogen in Intermetallic Compounds", vol. I, 1988, L. Schlapbach, editor, pp. 66–67.

"Hydrogen in Intermetallic Compounds", vol. II, 1991, pp. 226–227.

"Intermetalic Compounds as Bulk Getters", by M. H. Mendelsohn et al., Journal of the Less Common Metals, vol. 74, 1980, pp. 449–453.

(List continued on next page.)

Primary Examiner—Brian Healy
Attorney, Agent, or Firm—Eugen E. Pacher

[57] ABSTRACT

We have discovered that silica-based optical fibers that are doped with Ge, Al and a rare earth (e.g., Er) can be very susceptible to hydrogen-induced attenuation change. For instance, such fiber can exhibit loss increase rates that are, at 20° C., $10^6$ times larger than those of a standard single mode fiber. We also believe that transition metal-doped silica-based fibers can exhibit large hydrogen-induced attenuation change. In many circumstances (e.g., amplifier fiber, attenuator fiber) significant attenuation change of optical fiber is undesirable. We disclose that such change can be substantially eliminated by provision of hydrogen gettering material and/or a "hermetic" fiber coating. It is currently preferred to provide silica cladding material that is a hydrogen getter, and also provide a "hermetic" fiber coating. Containment of the fiber, together with a quantity of a gettering material (e.g., $ErFe_2$) in an essentially hermetic enclosure is also disclosed.

14 Claims, 3 Drawing Sheets

OTHER PUBLICATIONS

"The Properties of Some Zirconium-Based Gettering Alloys for Hydrogen Isotope Storage and Purification", by C. Boffito et al., *Journal of the Less-Common Metals*, vol. 104, 1984, pp. 149-157.

"Application of Organic Compounds to Metal-Hydrogen Systems as a Technique for Improving Sorption Properties: A New Class of Hydrogen Absorbers", by H. Imamura et al., *Journal of the Less-Common Metals*, vol. 106, 1985, pp. 229-239.

"Composition and Hydrogen Absorption of C14 Type Zr-Mn Compounds", by R. M. van Essen et al., *Materials Research Bulletin*, vol. 115, 1980, pp. 1149-1155.

"Reliability of Optical Fibers Exposed to Hydrogen: Prediction of Long-Term Loss Increases", by P. J. Lemaire, *Optical Engineering*, vol. 30, No. 6, Jun. 1991, pp. 780-789.

"OE/Fibers 1992 Focuses on Fiberoptic Sensors and Component Reliability", by E. D. Jungbluth, *Laser Focus World*, Aug. 2, 1992, pp. 30-35.

ARTICLE COMPRISING A RARE EARTH OR TRANSITION METAL DOPED OPTICAL FIBER

FIELD OF THE INVENTION

This invention pertains to articles, including communication systems, that comprise optical fiber doped with Ge, Al and a rare earth (e.g., Er), or with a transition metal (e.g., Cr).

BACKGROUND OF THE INVENTION

Most current and anticipated optical fiber communication systems use silica-based optical fiber, typically single mode fiber with a Ge-doped core.

It is known that exposure of such fiber to $H_2$ can result in an increase in the attenuation of signal radiation in the fiber. However, under typical operating conditions such $H_2$-induced loss is not a significant problem for standard single mode Ge-doped silica-based fibers. See, for instance, A. Tomita et al., *Electronics Letters*, Vol. 21, p. 71 (1985), which predicts loss increases at 1.3 and 1.55 μm of less than 0.01 dB/km after 20 years. See also P. J. Lemaire et al., *Conference Proceedings, 10th European Conference on Optical Communications*, September 1984, Stuttgart, which discloses that "conventional" single mode fibers containing Ge, P, and/or F are very resistant to OH formation upon exposure of the fiber to hydrogen at elevated temperatures, but that ". . . an alumina doped fiber reacted quickly to form Al—OH".

It is also known that fiber can be provided with a (exemplarily carbonaceous) coating that is substantially impermeable to $H_2$ and $H_2O$. See, for instance, U.S. Pat. No. 5,000,541. Such "hermetic" fiber can be advantageously used in applications such as oil well logging or undersea systems. The '541 patent also discloses use of "getter" sites to bond hydrogen that is diffusing into the cladding material of the fiber, such that the hydrogen does not reach the optically active region (consisting of the core and, possibly, a minor part of the cladding that is immediately adjacent to the core) of the fiber. See also P. J. Lemaire et al., *Materials Research Society Symposium Proceedings*, Vol. 172, p. 85 (1990), which inter alia discloses on p. 96 that ". . . the reaction of $H_2$ in optically inactive portions of a hermetic fiber can be advantageously used to scavenge trace amounts of hydrogen that might be present, leading to further improvements in fiber reliability".

P. J. Lemaire et al., *Technical Digest-Symposium on Optical Fiber Measurements*, National Institute of Science and Technology, Boulder, Colo., September 1990, Special Publication No. 792, inter alia disclose a model for the diffusion of hydrogen in hermetic fiber with reactive (gettering) sites and show experimental results for conventional fiber.

U.S. Pat. No. 5,059,229 addresses the "transient hydrogen sensitive attenuation phenomenon" and discloses drawing fiber from the preform while a $H_2$-containing gas is present in the draw furnace.

A. Oyobe et al., *Technical Digest, Conference on Optical Fiber Communication*, San Diego, Calif., February 1992, disclose a tightly coiled hermetic erbium-doped fiber (Er-doped Ge-silica center core, Ge-silica side core, F-doped silica cladding). The hermetic carbon coating was provided to prevent mechanical fatigue of the 200 m long fiber. The coil was designed for use in a compact optical fiber amplifier.

It is known to co-dope Er-doped amplifier fibers with Al. It is believed, inter alia, that the presence of alumina in the central core region makes it possible to attain higher Er-levels in that region than would be attainable in an Al-free fiber. See, for instance, U.S. Pat. No. 5,058,976.

SUMMARY OF THE INVENTION

We have made the unexpected discovery that silica-based optical fibers that are doped with Ge, Al and with a rare earth (RE; atomic number 57-71) element (for simplicity's sake such fibers will be referred to as "RE-doped" fibers. If RE is Er then they will be referred to as "Er-doped" fibers) are many times more sensitive to hydrogen-induced attenuation change than are, otherwise identical, RE and Al-free fibers. Exemplarily, we have found that, under certain conditions, some Er-doped fibers can show hydrogen-induced loss increase rates that are about $10^6$ times faster at 20° C. than those in standard single mode silica-based optical fibers. This is to be compared with silica-based fiber that is doped only with Al. Such fiber has hydrogen-induced loss greater than that of standard fiber, but much less than RE-doped fiber.

The length of optical amplifier fiber in a communication system typically is very small compared to the length of conventional fiber in the system (exemplarily, 30 meters of amplifier fiber every 30 km). Thus, at first sight the newly discovered sensitivity of RE-doped fiber to $H_2$-induced loss might not appear to constitute a significant problem, since only about 0.1% of the total fiber length is subject to the problem, and since typically the signal attenuation in unpumped amplifier fiber is relatively high. However, due to the very high susceptibility of the RE-doped fiber to $H_2$-induced loss, attenuation increases of the order of 0.1-10 dB per amplifier section are possible. This of course is equivalent to a drop of amplifier gain by approximately the same amount, a very significant change in the amplification level. (Those skilled in the art will know that in a typical optically amplified fiber communication system the gain per amplifier section is expected to be of order 10-30 dB).

Such large changes in gain will frequently be unacceptable in practical communication systems, e.g., in a submarine intercontinental fiber communication system. This application, in addition to reporting the discovery of this serious, unexpected problem, also discloses solutions to the problem.

We currently also believe that silica-based optical fiber (with or without Al doping) that is doped with a transition metal will also show large susceptibility to $H_2$-induced loss. Such fiber is of interest for, e.g., attenuators. Clearly, the loss value of an attenuator should be fixed, and not vary as a result of exposure to hydrogen. The herein disclosed solutions are also applicable to transition metal doped fibers.

Broadly speaking, in one embodiment the invention is an article or a system (collectively "article") that comprises a length of silica-based first optical fiber that comprises a core region and a cladding region surrounding the core region, said core region comprising Ge, Al and an element selected from the rare earths (atomic number 57-71). The article further comprises means for reducing the number of hydrogen atoms or molecules (collectively "atoms") that enter the core region of the first optical fiber from the cladding region, as evidenced by an at least 90% reduction of the hydrogen-induced rate of change of the optical attenuation at the operating wavelength of the article, compared to the rate of change in an otherwise identical article that does not comprise said means. Exemplary of such means are an appropriate fiber coating and/or means that comprise material that is capable of gettering hydrogen. The rate comparison will typically be made at the relevant operating temperature of the article.

In another embodiment the first optical fiber comprises a core region that comprises a transition metal, exemplarily selected from Ti, V, Cr, Mn, Fe, Co, Ni, Cu, Ag and Au. Typically the core region also comprises Ge, and it may also contain Al or other conventional dopant.

By "gettering" we mean herein either gettering by defects, typically but not necessarily in the optically inactive portion of the optical fiber, or by hydride-forming or hydrogen-dissolving materials external to the optical fiber. The former involves the rapid reaction of hydrogen at defect sites in the glass of the fiber, such that the reaction does not cause deleterious loss changes at a wavelength of interest. Typically this is accomplished by locating the defect sites away from the light-guiding (optically active) region of the fiber, but it can also be achieved by provision, in the optically active region, of defects whose loss contribution does not change when they react with hydrogen.

The article according to the invention can be a component such as an optical fiber amplifier or a fiber attenuator, or it can be a system that comprises the component. Exemplarily, such a system comprises signal generating means that are adapted for providing an optical signal of wavelength $\lambda_s$ (an operating wavelength), signal detection means that are adapted for receiving the optical signal and that are spaced from the generating means, and optical fiber means that are adapted for signal-transmissively connecting the generating means and the detection means. The optical fiber means comprise said first optical fiber. Exemplarily the system also comprises a source of pump radiation of wavelength $<\lambda_s$, and means for coupling the pump radiation into the first optical fiber.

In an exemplary embodiment of the invention at least a portion of the first optical fiber is enclosed in an essentially hermetic enclosure, with a quantity of hydrogen gettering material (e.g., hydride-forming or hydrogen absorbing metals, alloys, intermetallic compounds, or metal organic compounds, typically in a form that provides a large surface area, such as powder or porous bulk material) also contained in the enclosure.

In another exemplary embodiment the cladding material that surrounds the core of the first fiber comprises glass that is capable of gettering hydrogen. In preferred embodiments the cladding consists substantially of silica that is capable of gettering hydrogen. We have discovered that some commercially available fused silica (e.g., Heraeus F300 silica tubing, and General Electric 982 WGY waveguide quality fused quartz tubing) can, after conventional fiber processing, act as a hydrogen getter, whereas other commercially available fused silica (e.g., some flame fusion processed natural quartz tubing) not only is generally not a getter material but can even act as a hydrogen donor. Thus, appropriate choice of a fused silica substrate or overclad tube is an aspect of the invention. However, cladding material is not necessarily derived from a pre-existing fused silica substrate and/or overclad tube but can, for instance, be sol-gel material or be formed in situ. In these cases gettering centers can exemplarily be present in the cladding material, preferably the outer cladding, if the material is pure silica of low OH content, drawn at high tension.

In still another embodiment of the invention the fiber comprises a "hermetic" coating, i.e., a coating that substantially reduces (by at least 90%, preferably by 99% or more) in a getter-free fiber at 70° C. the maximum flux of hydrogen into the fiber core from the ambient, as compared to the flux into the core of an otherwise identical fiber that does not have the coating.

Those skilled in the art will recognize that, if desired, the first of the above-described embodiments can be combined with the second and/or third embodiment. Our currently preferred approach is a combination of the second and third embodiments.

DETAILED DESCRIPTION

Figure 1:
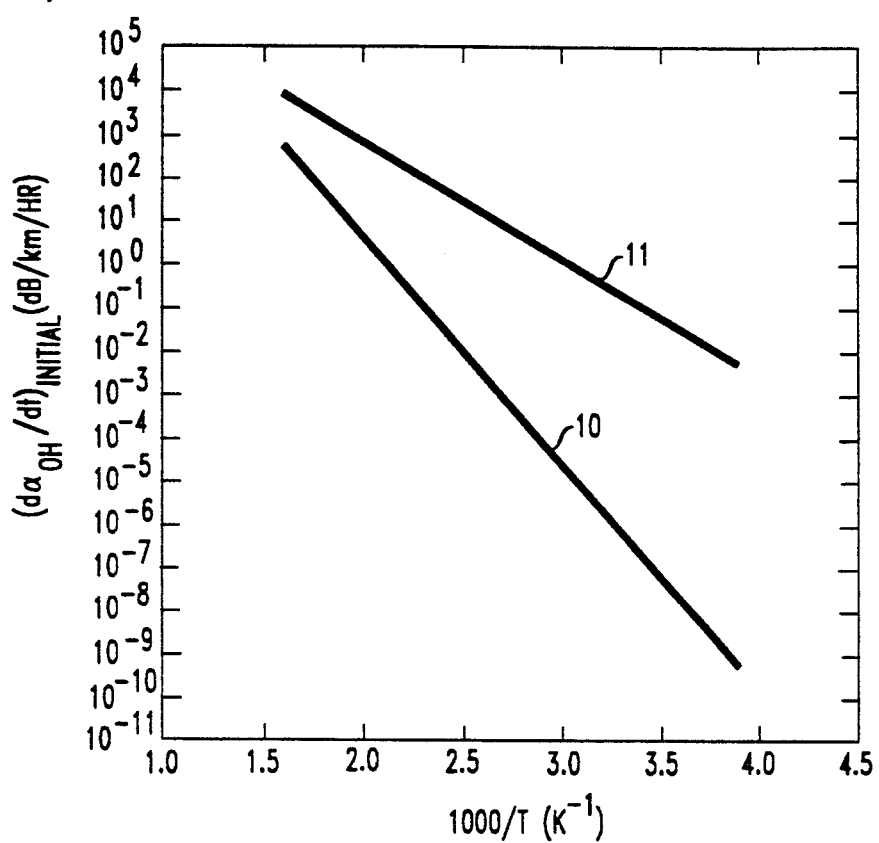
FIG. 1 shows data that illustrates the large difference between conventional silica-based fiber and RE-doped fiber with regard to their susceptibility to hydrogen-induced loss increase.

FIG. 1 shows $(d\alpha_{OH}/dt)_{initial}$ (the initial rate of fiber los increase due to OH in the fiber) vs. inverse absolute temperature. The initial rate is a known measure of the susceptibility of a fiber to hydrogen-induced loss. See, for instance, A. Tomita et al., op. cit., incorporated herein by reference. The data were obtained by exposing conventional single mode transmission fibers (5 D fiber available from AT&T; curve 10) and single mode Er-doped amplifier fiber (core doping 18% $GeO_2$; 2% $Al_2O_3$ and 200 ppm Er; curve 11) to 1 atmosphere of $H_2$ at various temperatures, and measuring the rate of fiber loss increase at $\lambda \sim 1.4$ $\mu$m. FIG. 1 shows that at 70° C. the initial rate of increase of the 5 D and Er-doped fibers is about $10^{-4}$ and 3 dB/km·hour, respectively, and at 7° C. it is about $3 \times 10^{-8}$ and $6 \times 10^{-2}$ dB/km·hour, respectively. FIG. 1 thus clearly demonstrates the huge difference in the susceptibility to hydrogen-induced loss between Ge-doped conventional transmission fiber and Er-doped amplifier fiber, especially at expected operating temperatures (e.g., 3°-70° C.).

We will now show that, by means of appropriately chosen and placed getter material and/or "hermetic" fiber coating, susceptibility to hydrogen-induced losses of RE-doped fibers can be significantly reduced, frequently to an insignificant level. The remainder of the relevant discussion will be primarily in terms of Er-doped fiber, but the invention is not so limited. In view of the known closely similar chemical properties of the rare earths, it can be expected that fibers doped with a rare earth other than Er (e.g., Pr, Nd, Yb, Ho) will behave very similar to Er-doped fiber. Furthermore, it is expected that silica-based fiber that is doped with a transition metal (or metals) will also exhibit significant susceptibility to hydrogen-induced attenuation changes (a decrease or increase of attenuation), and that this susceptibility can be reduced in the same manner as that of Er-doped fiber.

Figure 2:
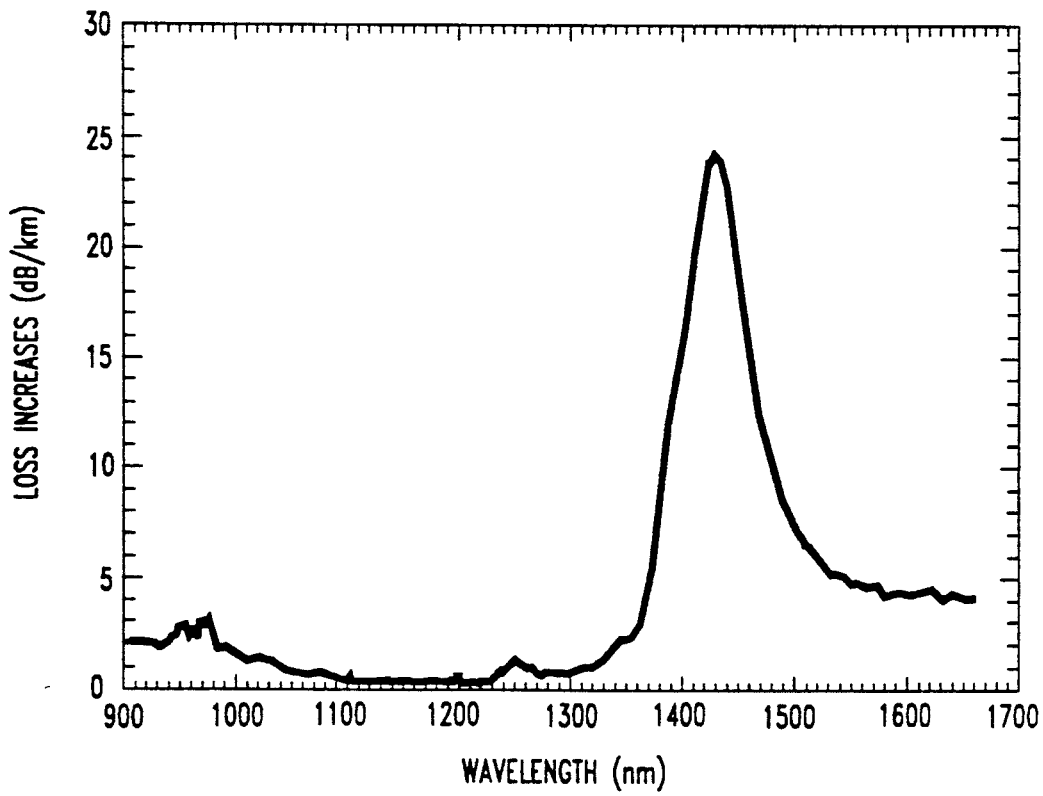
FIG. 2 gives exemplary data on hydrogen-induced loss increase as a function of wavelength.

FIG. 2 shows hydrogen-induced loss increase in a Er-doped silica-based fiber after 24 hours at 213° C. in $10^{-4}$ atmospheres of $H_2$. The fiber did not have a "hermetic" coating, and therefore the gettering sites present in the cladding were quickly depleted by reaction with hydrogen. The main loss peak at about 1.43 μm is believed to be due to the formation of OH in the fiber core. It is to be noted that this peak causes significant loss increase at 1.48 μm (a possible pump wavelength for Er-doped fiber amplifiers) and at 1.55 μm (the likely signal wavelength).

We have determined that for fiber such as that used to obtain the data of FIG. 2 the initial rate of OH loss increase at λ=1.43 μm can be predicted from the formula $$(d\alpha_{OH}/dt)_{initial} = (k_H^2/2k_L)[-1+(1+4(k_L/k_H)^2 P_H)^{\frac{1}{2}}],$$

wherein $P_H$ is the hydrogen pressure in atmospheres, $$k_L = C_{Al} \times 6.9 \times 10^3 \exp(-8.30 \text{kcal·mole}^{-1}/RT) \text{dB}/(\text{km·hour·atm·ppm})$$

and $$k_H = C_{Al}^{\frac{1}{2}} \times 1.37 \times 10^6 \exp(-12.4 \text{kcal·mole}^{-1}/RT) \text{dB}/(\text{km·hour·atm}^{\frac{1}{2}}\text{·ppm}^{\frac{1}{2}}),$$

where $C_{Al}$ is the Al concentration in the fiber core in ppm (1 ppm = $10^{-6}$ moles of Al/mole of $SiO_2$), R is the universal gas constant, and T is the absolute temperature. The loss increases at 1.48 and 1.55 μm are, respectively, about 0.5 and 0.2 times the loss at 1.43 μm for a fiber with $2 \times 10^4$ ppm of Al. The above formulae represent our current understanding, but further research may lead to changes. The formulae are disclosed as an aid to the understanding of the invention, but the scope of the invention does not depend on the correctness of the formulae.

From the above formulae it can be determined that, for an operating temperature of 75° C. and assuming a 25 year lifetime of the equipment, the pump loss (at 1.48 μm) in a 20 m fiber section would increase by about 0.25 dB if the fiber is in contact with an atmosphere having a hydrogen partial pressure of $1.4 \times 10^{-7}$ atmospheres. All else being equal, for an operating temperature of 3° C., the same increase would result from a hydrogen partial pressure of $1.9 \times 10^{-5}$ atmospheres. Higher hydrogen pressures would result in higher losses.

Typical ambient hydrogen pressures in the atmosphere are about $10^{-6}$ atmospheres. Much higher hydrogen pressures (possibly as high as several atmospheres) can occur in an enclosure if any corrosion cells exist therein, or if any $H_2$-evolving polymers are present. Hydrogen build-up to objectionable levels in an enclosure can be prevented by placement of an appropriate hydrogen getter material into the enclosure. Thus, an exemplary embodiment of the invention comprises a length of RE (or transition metal)-doped fiber and a quantity of hydrogen getter material in an enclosure, as is depicted schematically in FIG. 3. Exemplary of possible getter materials are known hydrogen getter metals such as Ti or Zr, alloys of such metals, intermetallic compounds such as $Zr(V_{1-x}Fe_x)_2$, $ZrMn_xFe_y$, $LaNi_{5-x}Al_x$, $Mg_2Ni$, $ErFe_2$, $DyFe_2$, $YFe_2$, $CeCo_2$, $CeNi_2$, $NdCo_3$, and metal-organic compounds, e.g., an intermetallic compound such as $SmMg_3$ reacted with an organic compound such as anthracene or perylene. For more information on possible getter materials see, for instance, K. H. J. Buschow in "Handbook of the Physics and Chemistry of Rare Earths", Vol. 6, pp. 90–97; "Hydrogen in Intermetallic Compounds", Vol. 1, 1988, L. Schlapbach, editor, pp. 66–67; and Vol. II, 1991, pp. 226–227; M. H. Mendelsohn et al., Journal of the Less Common Metals, Vol. 74, pp. 449–453 (1980); C. Boffito et al., J. of the Less Common Metals, Vol. 104, pp. 149–157 (1984); H. Imamura et al., J. of the Less Common Metals, Vol. 106, pp. 229–239, (1985); and R. M. van Essen et al., Materials Research Bulletin, Vol. 15, pp. 1149–1155 (1980); all incorporated herein by reference.

Desirably, such hydrogen gettering material has relatively large (exemplarily > 0.01, preferably > 0.1, mole $H_2$ per mole of the gettering material) solubility for hydrogen at partial pressures much less than 1 atmosphere (e.g., $< 10^{-3}$ atmospheres) and at temperatures near room temperature (e.g., 0°–80° C.), and has a plateau pressure that is much less than 1 atmosphere (e.g., ≦0.1 atmosphere, preferably $< 10^{-3}$ or even $< 10^{-5}$ atmospheres) in the same temperature range. The gettering material can be in any desired form, e.g., powder, porous solid or thin film, the latter deposited on any appropriate substrate including the fiber surface. The getter material may be bare or provided with a protective coating, provided the coating is permeable for hydrogen. Optionally the getter material is "activated" by an appropriate known heat treatment just prior to completion of the enclosure.

Figure 3:
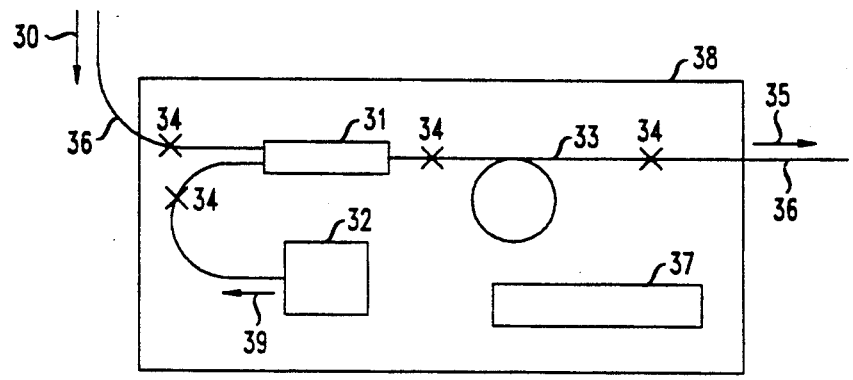
FIG. 3 schematically depicts an exemplary embodiment of the invention.

FIG. 3 shows schematically relevant aspects of an exemplary hermetically sealed optical amplifier module containing hydrogen gettering material. Incoming optical signal 30 in transmission fiber 36 enters wavelength division multiplexer 31. Pump laser 32 emits pump radiation 39 that also enters 31 and is coupled, together with the signal radiation, into amplifier fiber 33. After amplification the signal radiation enters transmission fiber 36'. Numeral 35 refers to the outgoing signal radiation. Inside hermetic enclosure 38 is positioned a quantity of hydrogen gettering material 37, exemplarily a lightly sintered body of $ErFe_2$ powder in a wire mesh holder. Numerals 34 refer to fiber splices. Electrical components and connections, as well as optional optical components (e.g., isolators, taps) are not shown. The module optionally contains a relatively inert atmosphere, e.g., Ar or N.

It is known that "hermetic" coatings can be used to limit the amounts of hydrogen that reaches a fiber core. This is accomplished by limiting the amount of hydrogen that enters the fiber cladding from the atmosphere in contact with the fiber. Herein a coating will be referred to as a "hermetic" coating if at 70° C. it reduces the maximum flux of hydrogen into the core of a getter-free fiber to at most 10% (preferably at most 1%) of the maximum flux into the core of an otherwise identical, uncoated fiber. Carbon coatings are known that are essentially impervious to hydrogen at relatively low temperatures, e.g., 40° C. and below, and substantially reduce the flux at somewhat higher temperatures (e.g., 40°–100° C.).

Hydrogen diffusion through a hermetic coating is believed to happen in two stages. The first stage involves hydrogen penetration only into the coating material, with no hydrogen reaching the fiber cladding.

Thus, essentially no loss increase occurs during the first stage. The length of the first stage is characterized by a time constant $\tau_i$. After the initial lag period, some hydrogen enters the cladding and therefore (assuming that the cladding material does not contain gettering centers) can reach the fiber core within a relatively short time. The rate of hydrogen penetration into the fiber in the second stage can be characterized by a time constant $\tau_f$. The loss increase, for times (t) greater than $\tau_i$ and less than $\tau_f$, can be expressed by the formula $$\Delta\alpha_{OH,initial} = [k_L P_{H,ext}(t-\tau_i)^2]/2\tau_f,$$

where $P_{H,ext}$ is the ambient hydrogen pressure, and all other symbols have been defined previously. The time constants $\tau_i$ and $\tau_f$ are properties of the hermetic coating and do not depend on the underlying fiber composition.

In a further exemplary embodiment of the invention the RE (or transition metal)-doped fiber is provided with a hermetic coating. The coating preferably is a carbon coating.

Those skilled in the art will recognize that provision of a hermetic coating will typically not be advantageous, and might actually be deleterious, if the fiber comprises material that can release hydrogen or a hydrogen-containing species. We have discovered that some types of fused silica indeed can release hydrogen. Exemplarily, at least some VAD-produced silica fibers deliberately use outer cladding material that evolves hydrogen, in order to simplify processing and improve transmission properties. Use of such material in a fiber of the type relevant herein should typically be avoided. Whether or not a particular type of fused silica can be a getter of hydrogen can be readily determined, as will be discussed below.

Figure 4:
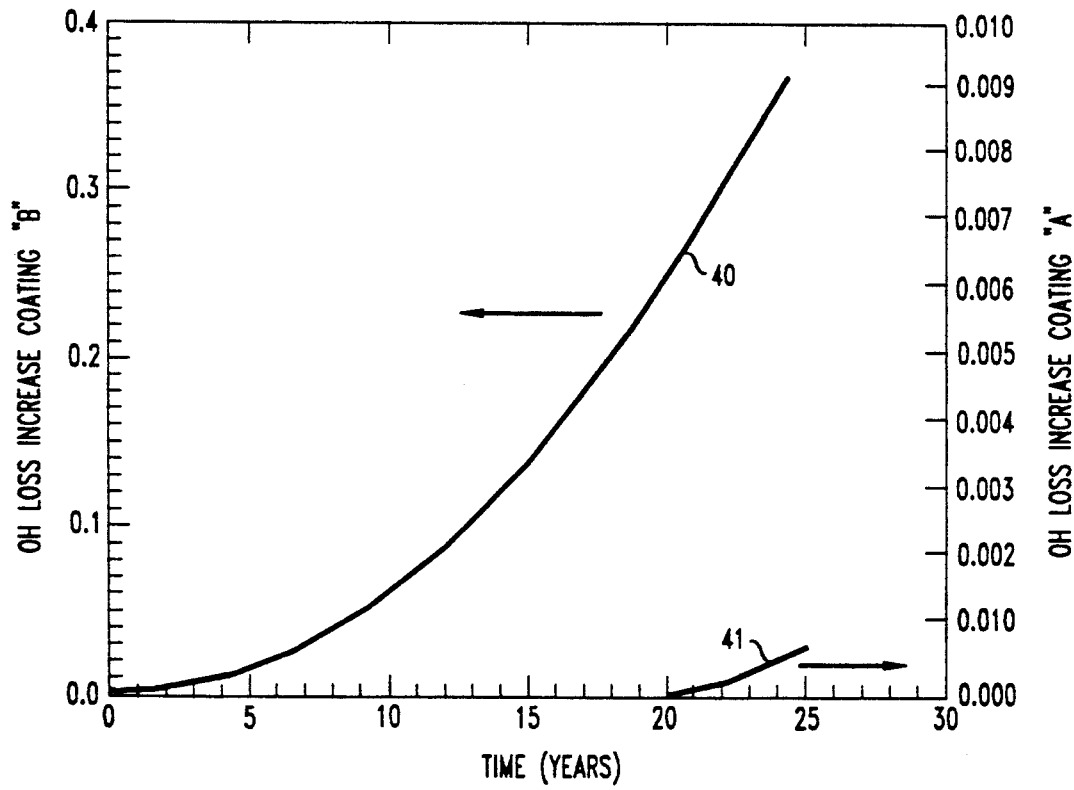
FIG. 4 shows predicted loss increase for two coated fibers.
Figure 7:
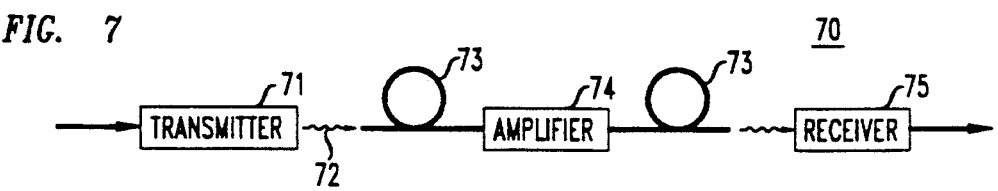
FIG. 7 schematically depicts an exemplary embodiment of the invention, namely, an optical fiber communication system that comprises optical amplification.

FIG. 4 shows predicted loss increases at 1.43 μm for two 20 m lengths of Er-doped fiber with different hermetic coatings. The fibers are assumed not to contain getter sites. The temperature is assumed to be 40° C., the external hydrogen pressure $10^{-3}$ atmospheres, and $k_L = 136$ dB/km·hour·atmosphere. Coating B (curve 40) was assumed formed under typical conditions (using $C_2H_2$, $Cl_2$ and $N_2$, thickness about 40 nm; see the '541 patent) and significantly reduces hydrogen-induced loss increase, as compared to an otherwise identical uncoated fiber. Coating A (curve 41) was assumed to be formed under conditions known to further improve hermeticity (using $C_2H_2$ and $H_2$; thickness greater than 60 nm; however, such coatings can result in somewhat lower fiber strength and thus are not always preferred). As FIG. 4 shows, a fiber with coating A, under the assumed conditions, is essentially free of hydrogen-induced loss increase for a typical design lifetime of 25 years.

Figure 5:
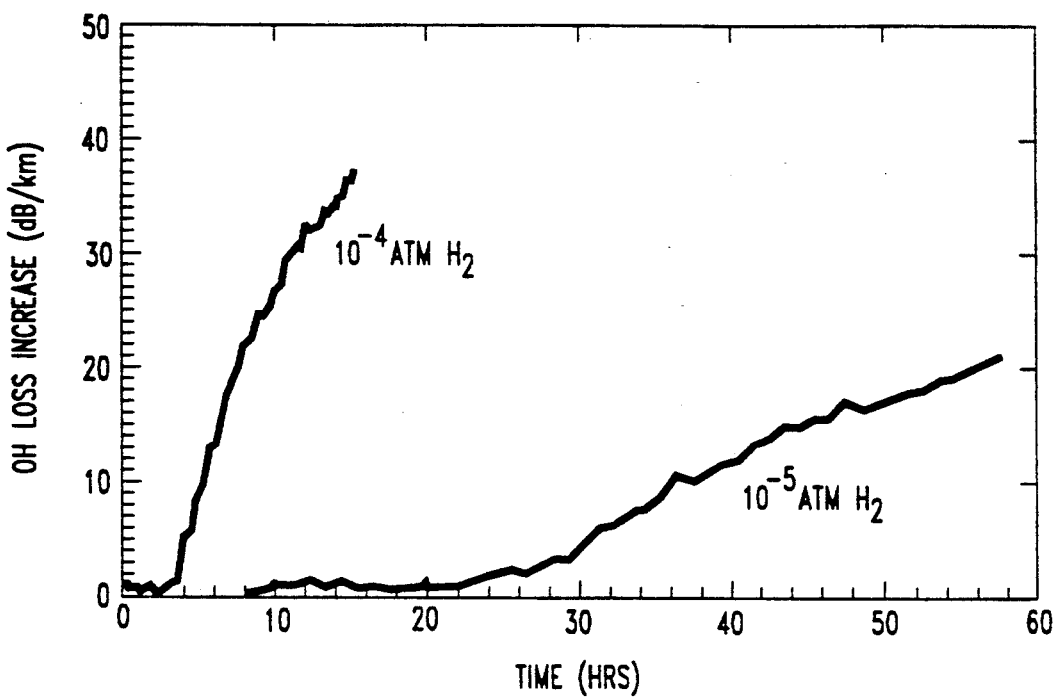
FIGS. 5 and 6 show exemplary data on loss increase as a function of time.

As was already mentioned above, we have found that some types of fused silica, including commercially available material such as Heraeus F300, can contain hydrogen gettering sites. A further embodiment of the invention thus comprises a RE (or transition metal)-doped optical fiber that comprises (typically in the form of cladding material) hydrogen gettering fused silica. Whether or not a given type of fused silica has hydrogen gettering properties can be readily determined, e.g., by exposure of a non-hermetic fiber (having cladding that consists of the given silica) to low levels of hydrogen. As exemplified by FIG. 5, if the silica is a hydrogen getter then there is a lag period before losses begin to increase. If that lag is due to gettering reactions, then its duration scales inversely with hydrogen pressure. The data of FIG. 5 was taken at 262° C., at $P_{H,ext}$ of $10^{-4}$ and $10^{-5}$ atmospheres, respectively.

For a non-hermetic fiber of outside radius b and core radius a the concentration of gettering sites $C_g$ in the cladding can be determined from the following formula.

$$C_g = 4D_H C_S t_g [2a^2 \ln(a/b) - a^2 + b^2]^{-1},$$

where $D_H$ is the diffusion coefficient for $H_2$ in $SiO_2$, $C_S$ is the equilibrium solubility of $H_2$ in $SiO_2$, and $t_g$ is the gettering lag time. We have found that in the above mentioned F300 silica the concentration of gettering sites is about 90 ppb. We believe that silica having more than about 10 ppb of hydrogen gettering sites can advantageously be used in the practice of the invention. Concentrations below that value are not expected to provide significant benefit.

Hydrogen-induced loss change in the fibers of interest herein can be most reliably suppressed if gettering is combined with a hermetic coating. Gettering can be by means of external gettering material and/or by means of silica cladding material that has gettering properties.

Figure 6:
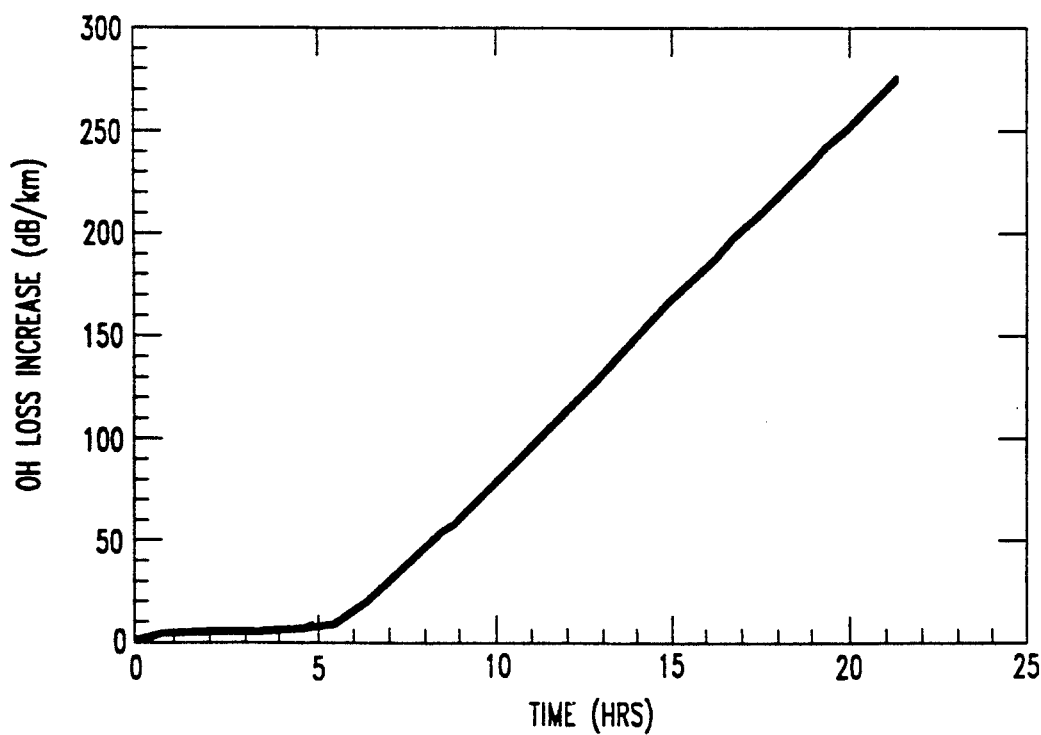

FIG. 6 shows data on hydrogen-induced loss increase at 1.43 μm for Er-doped hermetic fiber with a silica cladding containing about 94 ppb gettering sites, maintained at 263° C. in 1 atmosphere of $H_2$. The small loss increase for times <6 hours is due to hydrogen reactions in the non-hermetic 5D pigtail fibers that were spliced to the Er-fiber for experimental reasons. The observed initial lag period is made up of the diffusional lag period $\tau_i$ and a reactive lag period $t_{gh}$. After the lag period the hydrogen level inside the fiber rises towards an equilibrium value, at a rate that depends on the time constant $\tau_f$.

Table I shows predicted lag times (in years) for a Er-doped fiber with 80 ppb of gettering sites, with previously discussed hermetic coatings A and B, for various temperatures in $10^{-3}$ atmospheres of hydrogen.

TABLE I

| temperature | coating A | coating B |
| --- | --- | --- |
| 3° C. | $5.6 \times 10^7$ | $1.7 \times 10^6$ |
| 21 | $5.1 \times 10^6$ | $1.5 \times 10^5$ |
| 40 | $5.5 \times 10^5$ | $1.6 \times 10^4$ |
| 60 | $6.8 \times 10^4$ | $2.0 \times 10^3$ |
| 75 | $1.7 \times 10^4$ | 485 |

As can be seen, the disclosed approach can substantially eliminate the possibility of significant hydrogen-induced loss increase in the fibers that are of interest herein for substantially all realistic operating conditions.

We claim:

1. An article comprising optical fiber means comprising a silica-based optical fiber that comprises a core and a cladding surrounding the core, the core of the optical fiber i) comprising Ge, Al and an element selected from the group consisting of the rare earths (atomic numbers 57–71), or ii) comprising a transition metal element;

associated with the article being an operating wavelength and an operating temperature; CHARACTERIZED IN THAT the article comprises means for reducing in the optical fiber the rate of hydrogen-induced optical attenuation change at the operating wavelength and operating temperature by at least 90%, as compared to that rate in an otherwise identical article that does not comprise said rate-reducing means.

2. An article according to claim 1, wherein the rate-reducing means comprise silica cladding material that contains hydrogen gettering sites, said silica cladding material being at least a part of the optical fiber cladding.

3. An article according to claim 1, wherein the rate-reducing means comprise a quantity of hydrogen gettering material selected from the group consisting of the hydride-forming or hydrogen absorbing metals, alloys, intermetallic compounds and metal-organic compounds, said quantity of material and at least a portion of said optical fiber being enclosed in an essentially hermetic enclosure.

4. An article according to claim 1, wherein the rate-reducing means comprise, disposed on at least a part of the length of optical fiber, a coating that reduces at 70° C. the maximum hydrogen flux into the core by at least 90%, as compared to the maximum flux into the core of an otherwise identical fiber that does not have a coating, said coating to be termed a "hermetic" coating.

5. An article according to claim 4, wherein the optical fiber comprises silica cladding material that contains at least 10 ppb hydrogen gettering sites.

6. An article according to claim 4, wherein at least a portion of the optical fiber is enclosed, together with a quantity of hydrogen gettering material selected from the group consisting of the hydride-forming or hydrogen absorbing metals, alloys, intermetallic compounds and metal-organic compounds, in an essentially hermetic enclosure.

7. An article according to claim 5, wherein the hermetic coating comprises carbon.

8. An article according to claim 3, wherein the hydrogen gettering material possesses a plateau pressure, and the hydrogen gettering material is selected to have a plateau pressure of 0.1 atmospheres or less over the temperature range 0°–80° C.

9. An article according to claim 1, wherein the optical fiber is an amplifier fiber whose core comprises Ge, Al, and a rare earth element.

10. An article according to claim 9, wherein the rare earth element is Er.

11. An article according to claim 1, wherein the optical fiber is an attenuator fiber whose core comprises a transition metal element.

12. An article according to claim 11, wherein the transition metal element is Cr.

13. An article according to claim 1, wherein the article is an optical fiber communication system comprising radiation transmitting means and radiation receiving means, with said optical fiber means signal-transmissively connecting the transmitting means and the receiving means.

14. An article according to claim 13, wherein the optical fiber is located intermediate said transmitting means and said receiving means and is an amplifier fiber whose core comprises Ge, Al and Er.

* * * * *